(12) United States Patent
Kennedy

(10) Patent No.: US 7,211,163 B2
(45) Date of Patent: May 1, 2007

(54) LABELING ASSEMBLY

(75) Inventor: Patrick R Kennedy, Gates Mills, OH (US)

(73) Assignee: MPT, Inc., Willoughby, OH (US)

( * ) Notice: Subject to any disclaimer, the term of this patent is extended or adjusted under 35 U.S.C. 154(b) by 0 days.

(21) Appl. No.: 11/220,204

(22) Filed: Sep. 6, 2005

(65) Prior Publication Data

US 2006/0054266 A1    Mar. 16, 2006

Related U.S. Application Data

(63) Continuation of application No. 10/356,817, filed on Feb. 3, 2003, now abandoned.

(60) Provisional application No. 60/354,818, filed on Feb. 6, 2002.

(51) Int. Cl.
*B32B 37/00* (2006.01)
*B32B 43/00* (2006.01)
*G09F 3/02* (2006.01)

(52) U.S. Cl. .................... 156/247; 156/249; 40/625; 40/630; 283/70

(58) Field of Classification Search ................ 156/247, 156/249, 344; 428/40.1, 41.7, 41.8, 42.1; 40/626, 630, 642.02
See application file for complete search history.

(56) References Cited

U.S. PATENT DOCUMENTS

| | | |
|---|---|---|
| 3,854,229 A | 12/1974 | Morgan |
| 3,974,311 A | 8/1976 | Cherrin |
| 4,014,816 A | 3/1977 | Hogan et al. |
| 4,090,464 A | 5/1978 | Bishopp et al. |
| 4,253,899 A | 3/1981 | Takemoto et al. |
| 4,264,657 A | 4/1981 | Tollette |
| 4,359,358 A | 11/1982 | Hattemer |
| 4,363,685 A | 12/1982 | White |
| 4,398,985 A | 8/1983 | Eagon |
| 4,479,838 A | 10/1984 | Dunsirn et al. |

(Continued)

FOREIGN PATENT DOCUMENTS

DE    4028276    3/1992

(Continued)

OTHER PUBLICATIONS

Olliver, M. RFID Enhances Materials Handling. *Sensor Review*, vol. 15, No. 1, 1995, pp. 36-39.

(Continued)

*Primary Examiner*—Chris Fiorilla
*Assistant Examiner*—Sing P. Chan
(74) *Attorney, Agent, or Firm*—Pearne & Gordon LLP

(57) ABSTRACT

A labeling assembly and method of using same for releasably supporting a label and identifying a feature of an object upon which the labeling assembly is adapted for installation. The labeling assembly includes a protective layer having a release surface for releasably supporting the label and an information storage device located adjacent to a contacting surface of the protective layer such that the information storage device is disposed between the protective layer and the object when the labeling assembly is installed on the object. The information storage device is adapted for transmitting a signal comprising information. The method of the present invention includes using the labeling assembly for releasably supporting a label and identifying a feature of an object upon which the labeling assembly is adapted for installation.

18 Claims, 2 Drawing Sheets

U.S. PATENT DOCUMENTS

| | | | |
|---|---|---|---|
| 4,521,267 A | 6/1985 | Jacobson | |
| 4,534,582 A | 8/1985 | Howard | |
| 4,642,256 A | 2/1987 | Sato | |
| 4,767,654 A | 8/1988 | Riggsbee | |
| 4,863,772 A | 9/1989 | Cross | |
| 4,872,707 A | 10/1989 | deBruin | |
| 4,876,131 A | 10/1989 | Ashby et al. | |
| 4,928,874 A | 5/1990 | Henry et al. | |
| 4,932,684 A | 6/1990 | Vermeulen | |
| 4,933,124 A | 6/1990 | Duncan | |
| 4,938,414 A | 7/1990 | Lippert | |
| 5,019,436 A | 5/1991 | Schramer et al. | |
| 5,021,273 A | 6/1991 | Kobayashi | |
| 5,056,827 A | 10/1991 | Sasso | |
| 5,129,976 A | 7/1992 | Horikiri | |
| 5,248,536 A | 9/1993 | Du Katz | |
| 5,383,568 A | 1/1995 | Tusicket | |
| 5,417,790 A | 5/1995 | Petrou | |
| 5,628,858 A | 5/1997 | Petrou | |
| 5,682,143 A | 10/1997 | Brady et al. | |
| 5,822,714 A | 10/1998 | Cato | |
| 5,841,365 A | 11/1998 | Rimkus | |
| 5,963,134 A | 10/1999 | Bowers et al. | |
| 6,078,259 A | 6/2000 | Brady et al. | |
| 6,107,920 A | 8/2000 | Eberhardt et al. | |
| 6,137,414 A | 10/2000 | Federman | |
| 6,144,301 A | 11/2000 | Frieden | |
| 6,145,231 A | 11/2000 | Valiulis | |
| 6,147,662 A | 11/2000 | Grabau et al. | |
| 6,195,006 B1 | 2/2001 | Bowers et al. | |
| 6,204,764 B1 | 3/2001 | Maloney | |
| 6,206,282 B1 | 3/2001 | Hayes, Sr. et al. | |
| RE37,164 E | 5/2001 | Petrou | |
| 6,226,912 B1 | 5/2001 | Tackett et al. | |
| 6,229,445 B1 | 5/2001 | Wack | |
| 6,451,154 B1 * | 9/2002 | Grabau et al. | 156/300 |
| 6,520,544 B1 | 2/2003 | Mitchell et al. | |

FOREIGN PATENT DOCUMENTS

| | | |
|---|---|---|
| FR | 2649522 | 1/1991 |
| GB | 1090590 | 11/1967 |

OTHER PUBLICATIONS

IRS Package 1040-5, mailed by IRS in 2006, but believed similar to that used and mailed to taxpayers by IRS at least as early as 2000.

* cited by examiner

LABELING ASSEMBLY

This application is a continuation of U.S. patent application Ser. No. 10/356,817 filed Feb. 3, 2003, now abandoned, which claims the benefit of U.S. Provisional Patent Application Ser. No. 60/354,818 filed Feb. 6, 2002.

BACKGROUND OF THE INVENTION

1. Field of the Invention

The present invention is directed in general to labeling systems, and more particularly to a labeling assembly with an information storage device protected by a release coated protective layer. The present invention is further directed to a method for labeling objects using the above mentioned labeling assembly. In use, pressure-sensitive adhesive labels are easily removed and replaced on the labeling assembly reflecting changes in a feature of the object without adhesive buildup on the release coating. Additional information can also be transmitted to the information storage device to protect against mislabeling of the object.

2. Description of Related Art

Reusable containers often require a labeling system to identify the contents, or other feature of each container. The label provides information such as the origin and destination of the contents, batch number, part number, serial number, quantity, and description, for example. In most cases, these containers are thoroughly cleaned prior to reuse with contents According to a conventional labeling system, a transparent envelope for displaying a label is secured to the container. A label bearing visual indicia identifying the feature of the container is placed inside the envelope where it can be viewed, thereby indicating the feature to an observer. When the feature of the container changes, such as when its contents are changed, for example, a new label with visual indicia reflecting this change is substituted into the envelope for the previous label. A bar code is often printed on the labels to provide the observer with an automated method for extracting information pertaining to the feature. When the information conveyed by the bar code reflects that conveyed by the visual indicia on the label, the bar code provides the observer with an enhanced security against erroneous labeling. Alternatively, the bar code may convey separate information in addition that conveyed by the visual indicia, allowing the observer to include sensitive information on the label and make effective use of the visible surface area of the label.

As mentioned above, the container upon which the transparent envelope is secured is often cleansed before being reused. With each successive cleaning process, cleaning agents degrade the transparency of the envelope, causing interference with the visibility of the visual indicia on the label and the proper scanning of the bar code. Interference is also experienced where, after time, the transparent envelope becomes stained or dusty due to the environment the container is in. Also, the transparent envelopes are sometimes bulky and subject to tearing and catching on objects. Further, the bar code on the label is not adaptable to reflect changes in the feature of the container. Thus, a new bar code must be printed on each label to reflect a change of the feature. This becomes time consuming and requires printing equipment and a supply of labels upon which the bar codes can be printed.

Other proposed labeling systems call for an adhesive placard to be secured onto a container. Examples of such systems are those disclosed in U.S. Pat. No. 5,628,858 and U.S. Reissued Pat. No. US RE37,164 E, both issued to Petrou, and both of which are incorporated by reference in their entirety herein. According to the methods described in the Petrou Patents, the adhesive placard has an exposed release layer that facilitates the easy removal and replacement of pressure-sensitive adhesive labels. When the status of the container changes such as when its contents are changed, for example, the previous label is cleanly removed without leaving residual adhesive behind and a new label with current information is substituted in its place. Although the reading of bar codes and other visual labeling indicia according to the Petrou Patents is not obstructed by a transparent envelope, the labels affixed to the release layer are prone to wear and damage resulting from daily activities common to many commercial environments. Further, the Petrou labeling systems lack a built in security measure that can protect against mistakes stemming from accidentally or intentionally mislabeled containers or illegible labels due to physical damage from everyday use.

To help correct these shortcomings, many devices have been developed in an attempt to replace the above mentioned systems. One such device is commonly known as a radio frequency identification tag ("RFID tag"). A RFID tag receives information from a transmitter in the form of a radio frequency ("RF") signal. The RFID tag, through the help of an antenna and a circuit printed directly on the tag itself, receives and stores the information which can later be accessed with electronic equipment such as a RF receiver. Thus, the RFID tag eliminates the problems associated with interpreting visual labeling indicia by using RF signals instead. However, the RFID circuits are delicate and are susceptible to damage from cleaning operations performed on the reusable containers to which the tags are secured, and other environmental elements. Further, RFID tags that are affixed directly to metal containers often experience background interference from the metal container which makes the transfer of data to or from the RFID tag difficult. And the use of RFID tags alone to label a feature of a container also requires ready access to costly RF signal transmitting/receiving devices that are usually limited in availability. This may prevent personnel who most commonly interact with the containers from properly handling their contents due to the inability to read the RFID tag because of a lack of RF signal reading equipment without other, visual indicators.

BRIEF SUMMARY OF THE INVENTION

The present invention includes a labeling assembly for releasably supporting a label and identifying a feature of an object upon which the labeling assembly is adapted for installation. The labeling assembly includes a protective layer having a release surface for releasably supporting the label and an information storage device located adjacent to a contacting surface of the protective layer such that the information storage device is disposed between the protective layer and the object when the labeling assembly is installed on the object. The information storage device is adapted for transmitting information via a signal.

The labeling assembly can further include features such as visual indicia viewable through the release surface of the protective layer, or an insulator for insulating the information storage device from the object.

The present invention is also directed toward a method for providing visible identifying information and secondary identifying information as to a feature of an object on the object. The method includes substantially permanently affixing a labeling assembly to the object with a release surface of the assembly oriented outwardly and an information storing structure disposed between the release surface and the object, providing information pertaining to the feature on a label, applying the label to the assembly by securing a pressure sensitive adhesive coating of the label to the release surface of the assembly, and transmitting the secondary information to the information storing structure via a signal transmitted from an information transmitting device. The secondary information is accessible with an information receiving device when identification of the secondary information is desired.

A method for providing visible identifying information and secondary identifying information as to a feature of a reusable object on the reusable object is also within the scope of the present invention. The method includes substantially permanently affixing a labeling assembly to the reusable object with a release surface of the labeling assembly oriented outwardly, providing visible identifying information pertaining to the feature on a first label, applying the first label to the assembly by securing a pressure sensitive adhesive coating of the first label to the release surface of the assembly, and transmitting the secondary identifying information to the information storing structure via a signal transmitted from an information transmitting device, the secondary information being accessible with an information receiving device when retrieval of the secondary identifying information is desired. At a time when a change of the feature of the reusable object is desired, the method further includes the steps of removing the first label from the assembly while leaving the assembly affixed to the object, and applying to the assembly release surface, a pressure sensitive adhesive coating of a second label bearing information reflecting the change of the feature of the reusable object.

Other objects and advantages and a fuller understanding of the invention will be had from the following detailed description of an illustrative embodiment and the accompanying drawings.

BRIEF DESCRIPTION OF THE DRAWINGS

The foregoing and other features and advantages of the present invention will become apparent to those skilled in the art to which the present invention relates upon reading the following description with reference to the accompanying drawing, in which.

DETAILED DESCRIPTION OF THE INVENTION

Figure 1:
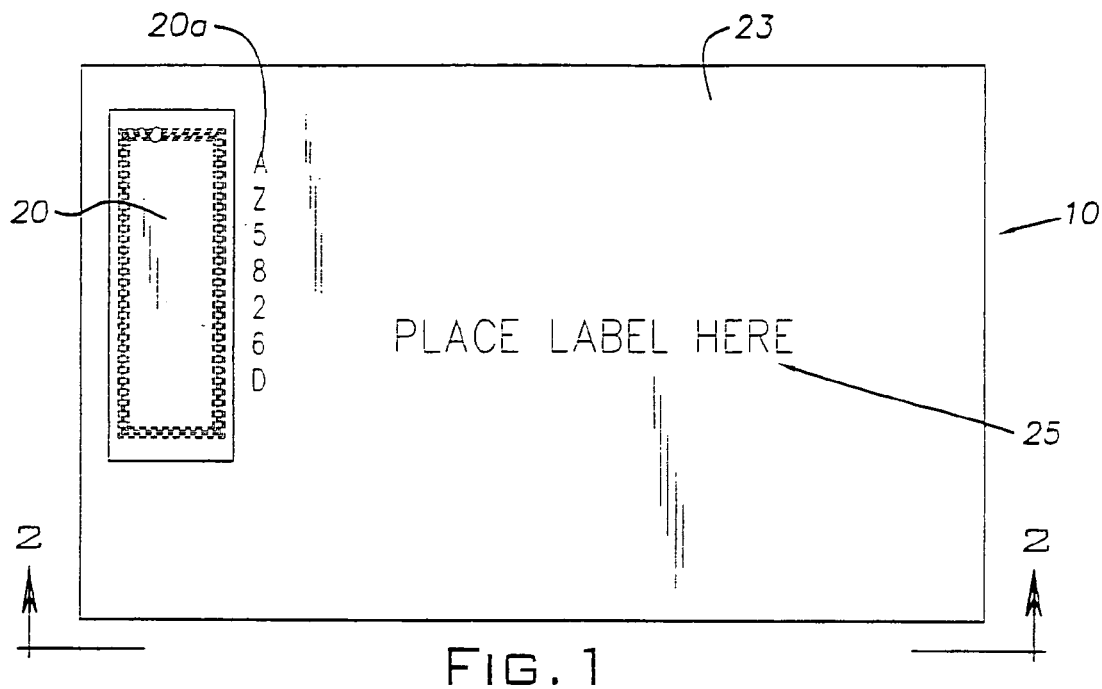
FIG. 1 is a front view of an illustrative example of a labeling assembly in accordance with the present invention.
Figure 2:
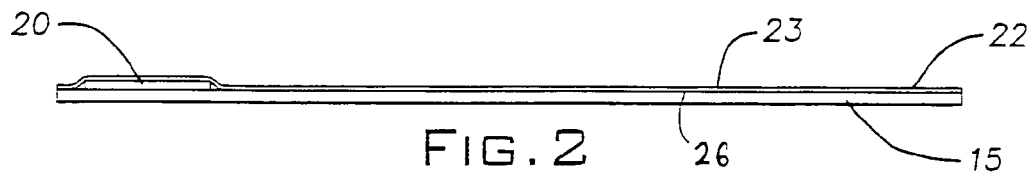
FIG. 2 is a cross-sectional view of the labeling assembly of FIG. 1 taken along line 2—2.
Figure 3:
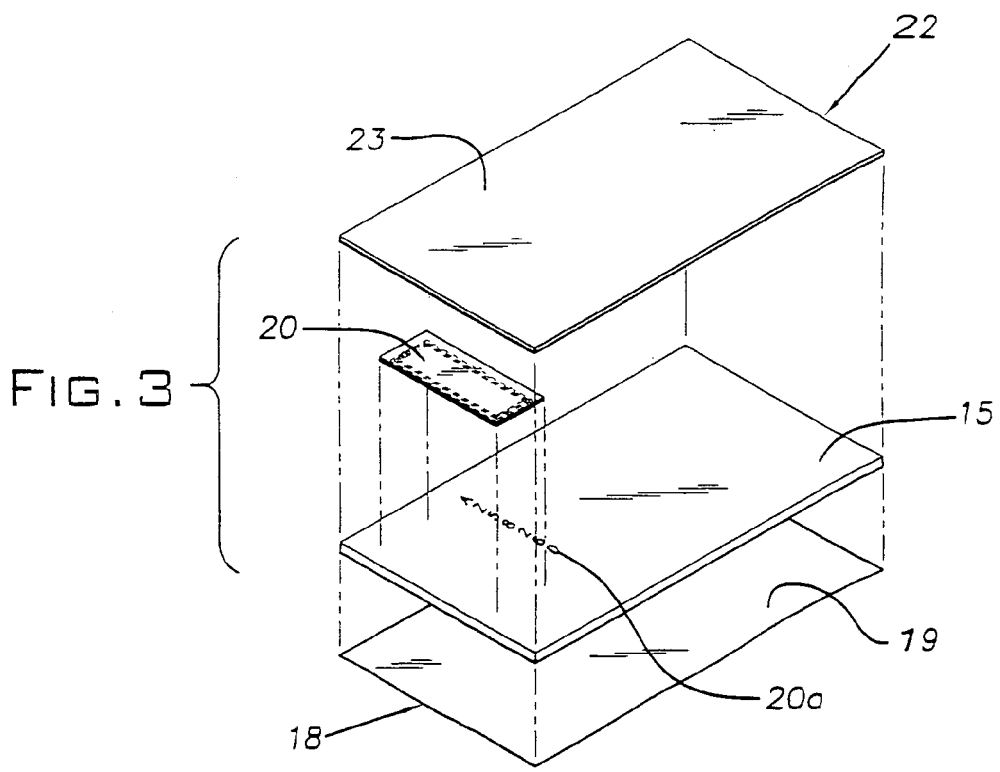
FIG. 3 is an exploded view of the labeling assembly illustrated in FIG. 1.

Certain terminology is used herein for convenience only and is not to be taken as a limitation on the present invention. In the drawings, the same reference numerals are employed for designating the same elements throughout the figures.

FIG. 1 is a top view of an example embodiment of a labeling assembly 10 housing a programmable information storage device 20. The information storage device 20 is disposed between an insulator 15 and a protective layer 22 to allow wireless communication with the information storage device 20, while protecting it from damage from the elements of its environment. And while FIG. 1 is an illustration of an embodiment where the information storage device 20 is located in the upper left-hand corner of the labeling assembly 10, the scope of the invention includes a labeling assembly 10 having the information storage device 20 located at any position between the insulator 15 and the protective layer 22.

The insulator 15 is a generally flat sheet of dielectric material. The insulator 15 can be a rigid structure or a pliable structure that can be bent to allow for installation on shaped objects 130. A variety of dielectric materials may be used to form the insulator 15, including polymeric materials, for example. However, other dielectric materials that do not cause the insulator 15 to conduct electricity or produce an electromagnetic field may be used with, or instead of the polymeric material. The dielectric property of the insulator 15 insulates the information storage device 20 from an object 130 upon which the labeling assembly 10 may be installed to minimize interference with communications between the information storage device 20 and a remote device. For example, where the information storage device 20 is a RFID tag, an electromagnetic field produced by a metal container supporting the labeling assembly 10 can cause interference with communications to and from the RFID tag. Similar interference is possible when the contents of a nonmetal container include metal items, as metal close to a RFID antenna, or a mass of metal passing the antenna of an RFID tag 20, can alter the matching of the antenna's characteristics to that of the remote device used for communicating with the RFID tag.

An adhesive (not shown) disposed on a surface of the insulator 15 enables installation of the labeling assembly 10 on reusable objects 130 such as containers, pallets, shelves, bins, storage racks, or any other object having a feature that is changeable over the useful life of the object 130. The changeable feature of the object 130 can be any characteristic desired to be identified on the object 130, including, for example, the contents of the object 130, the destination or source of the object 130, date information relating to the contents of the object 130, handling instructions for the contents of the object 130 or the object 130 itself, or any other characteristic relating to the current use of the object 130 or its contents. The adhesive on the surface of the insulator 15 is protected by a disposable liner 18 having a silicon-based release coating that separates the liner 18 from the adhesive. When the labeling assembly 10 is used, the disposable liner 18 is easily removed, leaving the adhesive exposed for installation of the labeling assembly 10 on the object 130.

Other fastening features can be used to either complement or replace the adhesive on the insulator 15. For example, as an alternative to the adhesive coating, another embodiment of the present invention can include an insulator 15 having a mechanical fastening feature (not shown), such as a hole for accepting a fastening member of the object 130, a threaded fastening member, rivet, screw, or any other mechanical fastener, for example, to install the labeling placard 10 on the object 130. A feature on the object 130 can also be adapted to receive and secure an edge, or a plurality of edges of the labeling assembly 10 to facilitate its installation on the object 130. When one or more of the alternative fastening features are present, the adhesive on the labeling placard 10 is not necessary, but can be included on the insulator 15 as a secondary fastener.

Figure 5:
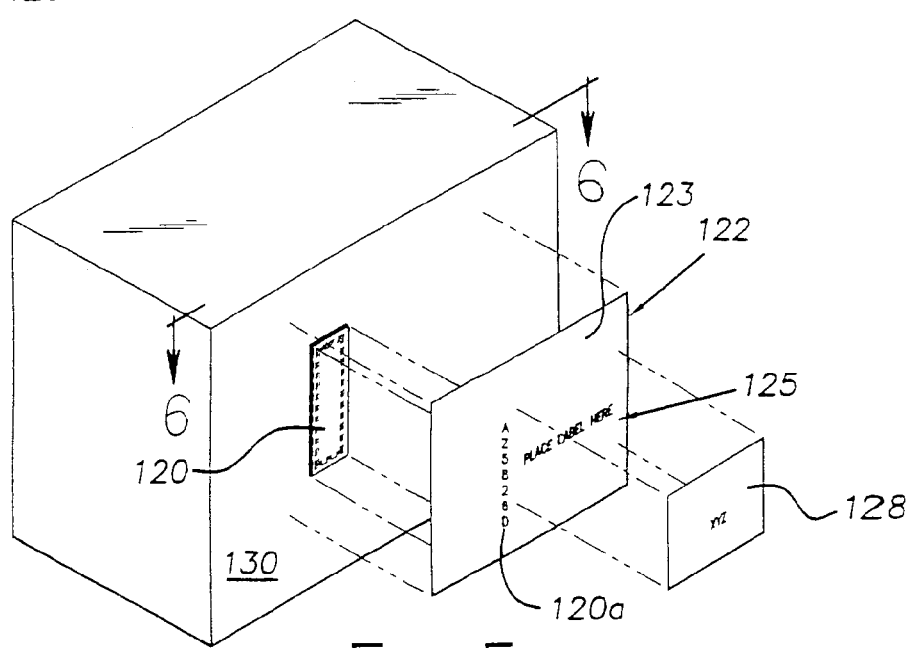
FIG. 5 is an exploded view of the second illustrative example of a labeling assembly in accordance with the present invention shown adjacent to an object.

The protective layer 22 is a pliable film of material having a release surface 23 for releasably supporting a pressure sensitive adhesive label 128 (FIG. 5). The pliable nature of the protective layer 22 allows the protective layer 22 to conform to the shape of the information storage device 20, forming a generally hermetic seal about the information storage device 20. The release surface 23 may be a coating applied to the protective layer 22 or may be a property of the material from which the protective layer 22 is made. A contacting surface 26 of the protective layer 22 is secured to the insulator 15 with an adhesive such that the release surface 23 of the protective layer 22 is outermost, to face away from the object 130 when the labeling assembly 10 is installed thereon. The protective layer 22 can be formed from a polymeric compound, such as polyester or polypropylene, for example, that is durable and resistant to industrial solvents, cleaning agents and prolonged exposure to ultraviolet light.

Visual indicia 25 can optionally appear on the labeling assembly 10 to convey instructional information, or identifying information, for example. For example, the visual indicia 25 reading "PLACE LABEL HERE" in FIG. 1 indicates a location where the label 128 can be releasably applied. Additional visual indicia 20a can be included to provide an additional source of information relating to the feature of the object 130, to the object 130 itself, or to the information storage device 20. An example of such additional visual indicia 20a is illustrated vertically as "A Z 5 8 2 6 D" in FIG. 1. Since the visual indicia 20a, 25 (or 120a, 125 in the second embodiment shown in FIGS. 4–6, described below) is permanently printed on the labeling assembly 10, it conveys information about a feature that does not change. The visual indicia 20a, 25 can be printed on the release surface 23 or the contacting surface 26 of the protective layer 22, it may be printed within the protective layer 22 at a location between the release surface 23 and the contacting surface 26, or it may be printed on the insulator 15. If the visual indicia 20a, 25 is printed at a location other than on the release surface 23 of the protective layer 22, it is viewable through a transparent portion of the protective layer 22.

The information storage device 20 is disposed between the protective layer 22 and the insulator 15. An adhesive secures the information storage device 20 in place on the insulator 15 or the protective layer 22 to secure the information storage device 20 between the object 130 and the protective layer 22. Information storage devices 20 such as the RFID tag are well known in the art. Generally, RFID tags include a semiconductor chip having radio frequency, logic, and memory circuits, and an antenna mounted on a substrate and encapsulated by an organic film. The antenna includes one or more lengths of wire that are connected directly to the semiconductor chip by wire bonding, or another connection method. Information is transmitted between the RFID tag and the remote device, which can be a RF transceiver, for example, via a RF signal that is originally generated by the remote device. When the antenna of the RFID tag receives the RF signal, the circuits of the RFID tag modulate the received signal according to some preprogrammed logic to reflect the information being reflected back to the remote device. The modulated RF signal is then reflected back through the antenna to the remote device that originally transmitted the RF signal. Unlike bar codes or other permanent markings, the RFID tag can be reprogrammed through this operation With information reflecting changes in the feature of the object 130.

The labeling assembly 10 is preferably assembled from commercially available products. For example, transparent polypropylene film having a silicone release surface 23 is commercially available from the Mobil Chemical Corporation. A disposable liner 18 having a silicon release coating and a layer of white modified acrylic adhesive laminated to one side, is commercially available from the 3M Corporation. The contact surface of the polypropylene film is laminated to the insulator 15, followed by the application of the disposable liner 18 to the surface of the insulator 15 to produce the labeling assembly 10. The labeling assembly 10 is then die-cut to remove a marginal portion of the polypropylene film and the adhesive. Thus, the disposable liner 18 is larger than the insulator 15 to facilitate removal of the liner 18.

Figure 4:
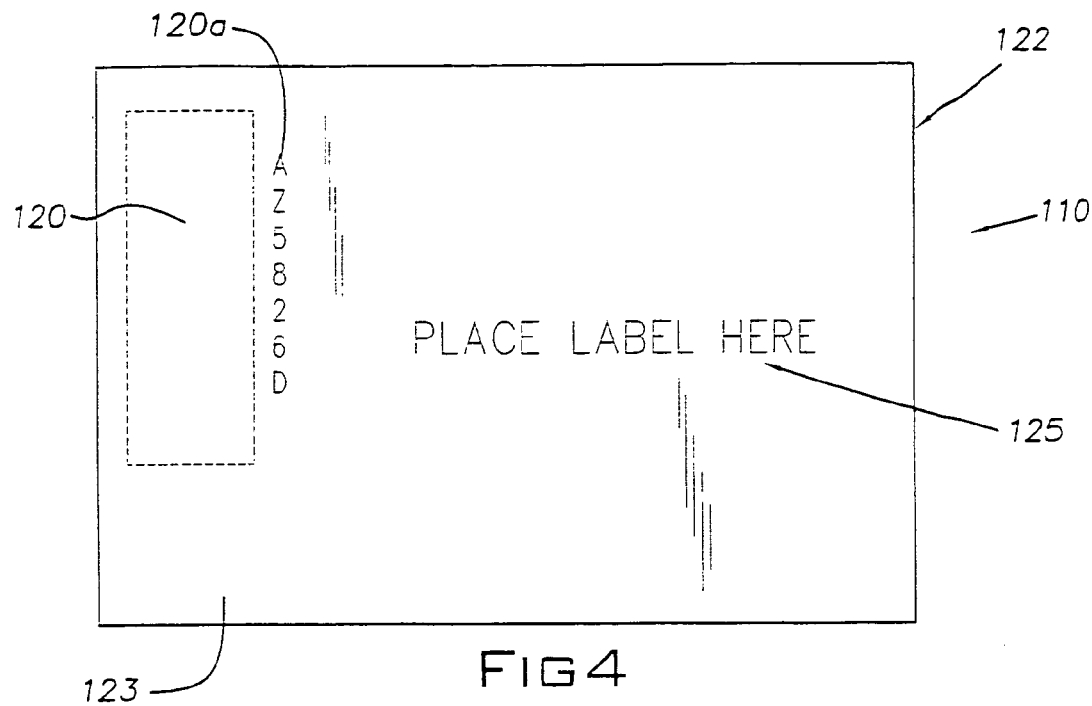
FIG. 4 is a front view of a second illustrative example of a labeling assembly in accordance with the present invention, an information storage device being shown in phantom.
Figure 6:
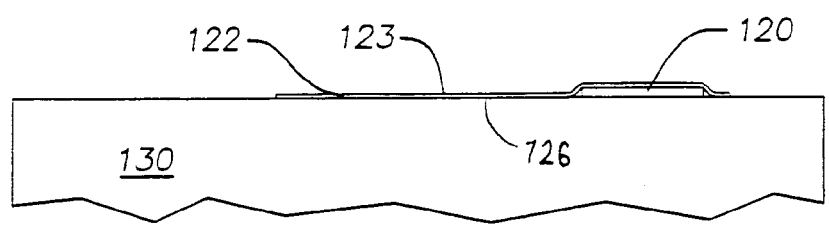
FIG. 6 is a cross-sectional view of the second illustrative embodiment of a labeling assembly in accordance with the present invention taken along line 6—6.

FIGS. 4–6 illustrate a second embodiment of the present invention. The second embodiment of the labeling assembly 110 minimizes the cost of the labeling assembly 110 and is generally for use on non-metal objects 130, and objects 130 that do not contain metal items. Similar to the first embodiment described above, the second embodiment includes a programmable information storage device 120 disposed between a protective layer 122 and an object 130. However, the second embodiment does not include an insulator 15 to insulate the information storage device 120 from the object 130. Instead, an adhesive (not shown) secures the information storage device 120 to the protective layer 122, and the protective layer 122 with the information storage device 120 is adhesively installed on the object 130.

The protective layer 122 in the second embodiment is similar to the protective layer 22 discussed above with regard to the first embodiment. It is a pliable film of material that has a release surface 123 for releasably supporting a pressure sensitive adhesive label 128 (FIG. 5). The pliable nature of the protective layer 122 allows for installation of the labeling assembly 110 on a contoured surface of the object 130. Further, the pliable protective layer 122 can conform to the shape of the information storage device 120 and form a generally hermetic seal about the information storage device 120. The release surface 123 may be a coating applied to the protective layer 122 or may be a property of the material from which the protective layer 122 is made. A contacting surface 126 of the protective layer 122 is secured to the object 130 by an adhesive on the protective layer 122 such that the release surface 123 of the protective layer 122 is outermost, to face away from the object 130 when the labeling assembly 110 is installed thereon. A disposable liner (not shown) similar to that of the first embodiment covers the adhesive on the protective layer 122 until installation of the labeling assembly 110 is desired, at which time the disposable liner is removed. The protective layer 122 can be formed from a polymeric compound, such as polyester or polypropylene, for example, that is durable and resistant to industrial solvents, cleaning agents and prolonged exposure to ultraviolet light.

The information storage device 120 of the second embodiment can be secured to either the object 130 or the protective layer 122 prior to installation of the labeling assembly 110 by an adhesive disposed on a surface of the information storage device 120. When the information storage device 120 is secured to the protective layer 122 prior to installation, the information storage device is located between the adhesive on contacting surface 126 of the protective layer 122 and the disposable liner protecting the adhesive. When installation is desired, the disposable liner is removed and the protective layer 122 with the information storage device 120 is installed on the object 130 such that the adhesive on the protective layer 122 contacts the object 130.

In addition to the Petrou methods set forth in the U.S. Patents incorporated above, the present invention provides a novel method for labeling reusable objects 130. The novel method includes sending feature information to the information storage device 20 in addition to displaying feature information on a pressure sensitive adhesive label 128 to be affixed to the labeling assembly. In use, the labeling assembly 10 according to the first embodiment of the present invention is installed on the object 130 by removing the disposable liner 18 and exposing the adhesive on the insulator 15. Once exposed, the adhesive is placed in contact with the object 130, securing the labeling assembly 10 to the object 130 with the release surface 23 outermost and any visible indicia clearly visible. Any alternate fastening features of the labeling assembly 10 are likewise used with compatible features of the object 130 to similarly install the labeling assembly 10 on the object 130. A label 128 is applied to the labeling assembly 10 such that an exposed adhesive surface of the label 128 contacts the release surface 23 of the protective layer 22. The label 128 carries printed indicia relating to the object 130 or the feature of the object 130 to be identified. Using the remote device, a wireless signal is transmitted to the information storage device 20 to store information relating to the feature identified by the printed indicia, or a secondary feature that is not related to the feature identified by the printed indicia.

The printed indicia on the label 128 can be observed by those who desire information relating to the feature of the object 130. If the integrity of the label 128 has been compromised such that the printed indicia is unreadable, if the printed indicia is believed to be erroneous, or if it is desirable to retrieve the information from the information storage device 20, the remote device is used to retrieve such information. The remote device transmits a wireless signal to the information storage device 20, which returns the desired information via a return wireless signal to the remote device. If the information storage device 20 is a RFID tag, the remote device transmits a RF signal to the RFID tag. This RF signal is modulated by the RFID tag circuitry as described above, and the modulated signal is reflected by the RFID tag back to the remote device. The remote device interprets the modulated RF signal to display the secondary feature information.

When desired, such as when the feature identified by the printed indicia changes, the label 128 is removed from the release surface 23 of the protective layer 22, and a new label 128 carrying printed indicia relating to the changed feature is applied as before. If changing the information of the feature stored in the information storage device 20 is also desired, the remote device is used to transmit the new information via a wireless signal to the information storage device 20. Just as before, the transmitted information is retained by the information storage device 20 for future access with the remote device.

The labeling assembly 10 allows pressure-sensitive labels 128 to be easily removed and replaced as many times as necessary without a significant build-up of residual adhesive from the labels 128 on the release surface 23. Labels 128 can be removed without ripping or tearing, and the visibility of the labels 128 is not obstructed by a plastic envelope. These features of the present invention also allow use of inexpensive labels with so-called permanent pressure sensitive adhesive coatings rather than more expensive removable labels.

A method for labeling reusable objects 130 with the device of the second embodiment of the present invention is similar to the labeling method with the device of the first embodiment. Preparing and installing the insulator 15 on the object 130 is not required to install the second embodiment of the labeling assembly 110. Instead, the disposable liner disposed on the adhesive coated surface of the protective layer 122 is removed, exposing the adhesive. The protective layer 122 is installed on the object 130 to encapsulate the information storage device 120 between the object 130 and the protective layer 122 such that the adhesive coated surface of the protective layer 122 contacts the object 130 about the information storage device 120.

It is evident that one skilled in the art given this disclosure could develop equivalent embodiments which are also within the contemplation of the inventors.

What is claimed is:

1. A process for providing identifying information as to the contents of an object on such an object, the process comprising:
   a) substantially permanently affixing a placard to one such object with a release coated surface of the placard oriented outwardly, said placard further comprising an electronic information storage device disposed between the release coated surface and said object when the placard is affixed thereto, said information storage device being adapted to store information transmitted thereto from a transmitting device and to transmit stored information to a receiving device;
   b) providing a first label bearing information related to a first set of object contents;
   c) applying the first label to the placard by securing a pressure sensitive adhesive coating of the first label to the placard release coating;
   d) transmitting information pertaining to said first set of object contents to said information storage device;
   e) at a selected one of a time prior to and a time subsequent to the first label applying step positioning a first contents set in the object;
   f) removing the first contents set from the object and replacing it with a second contents set; and,
   g) at a selected one of a time prior to and a time subsequent to the first set removal step removing the first label from the placard while leaving the placard affixed to the object and applying to the release coated surface of the placard a pressure sensitive surface of a second label bearing information related to contents of the second set.

2. The process of claim 1, further comprising:
   h) at a selected one of a time prior to and a time subsequent to the first set removal step, transmitting information pertaining to said second contents set to said information storage device.

3. The process of claim 1, wherein the information transmitted to said information storage device is, at least in part, the same as information on said first label.

4. The process of claim 1, wherein the step of removing the first label includes removing the pressure sensitive adhesive of the first label from the release coating.

5. The process according to claim 1, wherein said placard is provided with a disposable liner having a release coating for covering an adhesive coated surface of said placard prior to attachment of said placard to the object.

6. A method of labeling and relabeling an object with replaceable pressure-sensitive adhesive-backed labels comprising:
   a) providing a plurality of pressure sensitive adhesive coated labels having indicia printed thereon;
   b) providing a placard having an adhesive coated surface, a release coated surface and an electronic information storage device disposed between said adhesive coated and release coated surfaces, said information storage device being adapted to store information transmitted thereto from a transmitting device and to transmit stored information to a receiving device;
   c) substantially permanently affixing the placard to the object by applying the adhesive coated surface of said placard to a surface of the object with the release coated surface oriented outward;
   d) applying a first label to the placard by securing the pressure sensitive adhesive coating of the first label to the placard release coated surface;
   e) at a selected one of a time prior to and a time subsequent to the first label applying step, positioning a first contents set in the object;
   f) at a selected one of a time prior to and a time subsequent to the first label applying step, transmitting information pertaining to said first contents set to said information storage device;
   g) removing the first contents set from the object and replacing it with a second contents set; and
   h) at a selected one of a time prior to and a time subsequent to the first set removal step, removing the first label by separating the pressure sensitive adhesive coating of the first label from the release coated surface of the placard while leaving the placard fully attached to the object and applying to the release coated surface of the placard a pressure sensitive adhesive coating of a second label having indicia related to the contents of the second set.

7. The method of claim 6, further comprising:
   i) at a selected one of a time prior to and a time subsequent to the first set removal step, transmitting information pertaining to said second contents set to said information storage device.

8. The method of claim 6, wherein the information transmitted to said information storage device is, at least in part, the same as information on said first label.

9. The method according to claim 6, wherein said placard is provided with a disposable liner having a release coating for covering the adhesive coated surface of said placard prior to attachment of said placard to the object.

10. A process for providing identifying information as to the contents of a reusable object on such an object, the process comprising:
   a) providing an object having a placard substantially permanently affixed to said object with a release coated surface of the placard oriented outwardly of said object and an electronic information storage device disposed between the release coated surface and said object, said information storage device being adapted to store information transmitted thereto from a transmitting device and to transmit stored information to a receiving device;
   b) providing a first label bearing information related to a first set of object contents;
   c) applying the first label to the placard by securing a pressure sensitive adhesive coating of the first label to the placard release coated surface;
   d) transmitting information pertaining to said first set of object contents to said information storage device;
   e) at a selected one of a time prior to and a time subsequent to applying the first label, placing a first contents set in the object;
   e) removing the first contents set from the object and replacing it with a second contents set; and,
   f) at a selected one of a time prior to and a time subsequent to removing the first set, removing the first label from the placard while leaving the placard affixed to the object, and applying to the placard release coated surface, a pressure sensitive surface of a second label bearing information related to the second contents set.

11. The process of claim 10, further comprising:
   g) at a selected one of a time prior to and a time subsequent to removing the first set, transmitting information pertaining to said second contents set to said information storage device.

12. The process of claim 10, wherein the information transmitted to said information storage device is, at least in part, the same as information on said first label.

13. The process of claim 10, wherein the step of removing the first label includes removing the pressure sensitive adhesive of the first label from the placard release coating.

14. The process according to claim 10, including providing said object having said placard substantially affixed by providing said placard having a disposable liner with a release coating for covering a placard adhesive coated surface, and removing said disposable liner prior to affixing said placard to the object by means of said placard adhesive coated surface.

15. A method of using a reusable container for products by labeling and relabeling the container comprising:
   a) providing said reusable container having a placard substantially permanently affixed to said container by means of a placard adhesive coated surface of said placard pressed against the container, and with a placard release coating of said placard oriented outwardly of said container, said placard further comprising an electronic information storage device disposed between the adhesive coated surface and the release coating of said placard, said information storage device being adapted to store information transmitted thereto from a transmitting device and to transmit stored information to a receiving device;
   b) inserting a first product into the container;
   c) at a selected one of a time prior to and a time subsequent to inserting said first product into said container, adhering a pressure sensitive adhesive coating of a first label bearing information about said first product to said placard release coating;
   d) at a selected one of a time prior to and a time subsequent to inserting said first product into said container, transmitting information pertaining to said first product to said information storage device;
   e) removing the first product from the container;
   f) inserting a second product into the container; and
   g) at a selected one of a time prior to and a time subsequent to inserting said second product into said container, removing the first label while leaving the placard affixed to the container, and thereafter adhering a pressure sensitive adhesive coating of a second label bearing second product information to the placard release coating.

16. The method of claim 15, further comprising:
h) at a selected one of a time prior to and a time subsequent to inserting said second product into said container, transmitting information pertaining to said second product to said information storage device.

17. The method of claim 15, wherein the information transmitted to said information storage device is, at least in part,h the same as information on said first label.

18. The method of claim 15, including exposing the placard adhesive coated surface by removing a disposable backing liner having a release layer adhered to the placard adhesive coated surface prior to affixing said placard to said container.

* * * * *